United States Patent
Lynn

(10) Patent No.: US 7,014,149 B2
(45) Date of Patent: Mar. 21, 2006

(54) TRACTION KITE DESIGN

(75) Inventor: Peter Robert Lynn, Ashburton (NZ)

(73) Assignee: Peter Lynn Limited, Ashburton (NZ)

( * ) Notice: Subject to any disclaimer, the term of this patent is extended or adjusted under 35 U.S.C. 154(b) by 211 days.

(21) Appl. No.: 10/473,114

(22) PCT Filed: Apr. 2, 2002

(86) PCT No.: PCT/NZ02/00054

§ 371 (c)(1),
(2), (4) Date: Sep. 29, 2003

(87) PCT Pub. No.: WO02/096753

PCT Pub. Date: Dec. 5, 2002

(65) Prior Publication Data

US 2004/0113019 A1 Jun. 17, 2004

(30) Foreign Application Priority Data

Mar. 29, 2001 (NZ) .................................. 510825

(51) Int. Cl.
B64D 17/02 (2006.01)

(52) U.S. Cl. .................. 244/153 R; 244/145; 244/902

(58) Field of Classification Search ............... 244/145, 244/146, 153 R, 155 R, 154, 900, 902; 114/39.12, 114/39.11, 39.21, 39.29, 102.11
See application file for complete search history.

(56) References Cited

U.S. PATENT DOCUMENTS

| | | | | |
|---|---|---|---|---|
| 3,093,354 A | * | 6/1963 | Pohl ............................ 244/154 |
| 3,298,635 A | * | 1/1967 | Barish ....................... 244/35 R |
| 3,412,963 A | * | 11/1968 | Struble, Jr. .................. 244/146 |
| 3,480,238 A | * | 11/1969 | Barish ......................... 244/142 |
| 4,129,272 A | | 12/1978 | Jones et al. |
| 4,708,078 A | | 11/1987 | Legaignoux et al. |
| 4,736,914 A | | 4/1988 | Tabor |
| 4,911,384 A | * | 3/1990 | Stankus .................. 244/153 R |
| 4,982,917 A | * | 1/1991 | Graske ....................... 244/145 |
| 5,033,698 A | * | 7/1991 | Schimmelpfennig .... 244/153 R |
| 5,322,247 A | * | 6/1994 | Munday et al. ......... 244/153 R |
| 5,366,182 A | | 11/1994 | Roeseler et al. |
| 5,417,390 A | * | 5/1995 | Southwick .............. 244/155 A |
| 6,364,251 B1 | * | 4/2002 | Yim ....................... 244/153 R |
| 2005/0127240 A1 | * | 6/2005 | Culp ........................... 244/15 |

FOREIGN PATENT DOCUMENTS

WO   WO 99/59866   11/1999
WO       01/58755    8/2001

* cited by examiner

Primary Examiner—Michael J. Carone
Assistant Examiner—Gabriel Sukman
(74) Attorney, Agent, or Firm—Nixon & Vanderhye P.C.

(57) ABSTRACT

An arch style traction kite which includes a wing or wing envelope which has a leading edge which, when viewed in plan with the wing or envelope laid in a horizontal plane, is concave in a centre section of the wing or envelope and straight or convex in plan near the tips of the wing. The concave leading edge feature can be incorporated in any arch style traction kite such as ram air inflated kites, single skin pneumatic tube framed kites and bridleless ram air inflated kites with flexible leading edge rods or in kites incorporating a combination of the features of such kites.

10 Claims, 7 Drawing Sheets

TRACTION KITE DESIGN

This application is the US national phase of international application PCT/NZ02/00054, filed 02 Apr. 2002, which designated the U.S. PCT/NZ02/00054 claims priority to New Zealand Application No. 510825, filed 29 Mar. 2001. The entire contents of these applications are incorporated herein by reference.

FIELD OF THE INVENTION

Arch style traction kites, which are defined below, are proving to be very successful for kite traction applications, and especially, but not only, for activities that are water based such as kite boarding and kite sailing. The current invention relates to improvements in arch style traction kite design. The invention may however find application in other kite, and similar aerodynamic, designs and such are not excluded from the scope and spirit of the invention.

BACKGROUND TO THE INVENTION

Some Technical Terms—

For the avoidance of doubt, where in this specification the following terms are used they have the following meaning.

Angle of Attack is the angle between the chord line of any airfoil profile and the apparent wind. For an arch style traction kite the overall angle of attack of the kite is usually taken to be the angle between the apparent wind and the average chord line of airfoils in the centre span section.

Centre of Pressure (also a term from aerodynamics) is the point at which all the aerodynamic forces generated by an airfoil section can be considered as acting. For the forms of airfoil section commonly used in arch style traction kites the centre of pressure, while the kite is flying, will generally lie between 10% and 20% of chord but in its extreme range can be anywhere between the leading edge and 50% chord. Amongst other influences the position of the centre of pressure point is a function of angle of attack generally moving further back from the leading edge as angle of attack increases except at very low angles of attack.

Chord line: in this document the chord line is a line drawn through the airfoil section from leading edge to trailing edge. A chord line is show by numeral 7 in FIG. 1.

Lift to Drag ratio: commonly shortened to L/D, this an aerodynamic term and with respect to traction kites is the ratio of the lift forces generated by a kite to the drag force penalty incurred in generating this lift at a given wind speed. L/D is the primary definition of a kite's aerodynamic efficiency Load line: for an arch style traction kite the line from tip to tip passing through the centre of pressure of all the sections that make up the kite is called the load line. The load line position will change with changing angle of attack, generally shifting further from the kite's leading edge at every section as the kite's angle of attack increases. On average the load line lies on a plane defined by the kite's flying lines where they enter the kite summed as vectors when there are more than two flying lines and approximately at right angles to the wind direction. It can deviate from this plane only to the extent that the kite's structure has sufficient rigidity, particularly torsionally, to support local variations. The load line is a concept not an actual physical feature. The load line is indicated by numeral 6 in FIGS. 4, 7 and 8.

Luffing is the tendency for a kite's angle of attack to become suddenly negative. Occurring usually in turbulent winds or when overflying, in extreme cases luffing will cause a traction kite to fall from the sky uncontrollably.

Overflying: in turbulent winds or when the flier executes extreme manoeuvres such as jumping it is possible for traction kites to momentarily fly upwind from the flier. Overflying is common enough in traction kiting experience that a kite's inherent ability to recover from this situation has become an important measure of its performance.

Pull control: for traction kites with more than two lines the flier can change the amount of pull generated at any time by using the extra line(s) to change the kite's angle of attack which in turn influences the amount of lift it generates. "Power control" and "sheeting" have the same or a similar meaning to pull control with respect to traction kites.

Stalling is where a kite's angle of attack relative to the apparent wind increases until an angle is reached at which any further increase will cause the total lift being generated by the kite to decrease rather than increase further. This is called the kite's stall angle.

Stall angles can be defined similarly for each individual part of a kite. The minimum apparent wind speed at which a kite can generate sufficient lift to support its own weight and that of the flying lines is the kite's stall speed.

Desirable Characteristics

In order to understand the requirements of traction kite design an understanding of desirable characteristics is needed. The following are desirable characteristics for traction kites.

Resistance to stalling. It is desirable that traction kites have a low stalling speed and can recover from stalls with minimum increase in the apparent wind.

Resistance to luffing. Traction kites that are more resistant to luffing in turbulent wind and that will accept more overflying without luffing or inverting offer users greater security and are therefore more sought after.

Pull control (also called sheeting or power control). For all traction kiting activities safety and performance are improved by providing the flier with control over the amount of pull generated by the kite at any given time. Therefore, kite design features that can allow more control of pull are advantageous.

Precise Steering. From the users perspective steering needs to be fast, precise and predictable with as little lag as possible rather than slow or "soggy". Most larger size arch style traction kites turn slower than users would wish and this is a major challenge for designers of such kites. Very small traction kites of all types tend to turn dangerously fast in strong winds and in this case the designers challenge is to slow their steering.

High L/D. Users desire that their traction kite's Lift to Drag ratio should be a high as possible. L/D is the determinant of upwind ability and, for kite boarder's, a major contributor to potential jump height and hang time.

In the special case of arch style traction kites, any tendency for the kite to fail to hold its "arch" shape and fold up while flying is highly inconvenient and can be dangerous. Design features that reduce or eliminate shoulder collapsing, the usual cause of folding or "hand clapping", are therefore highly desirable.

The above list of traction kite performance characteristics is not complete but covers most of the major user requirements in so far as they are relevant to the current invention. Of course, users also want kites that are powerful for their size, robust, affordable, of attractive appearance, can be launched and retrieved easily and, in the case of water based activities, are relaunchable from water.

Prior Art

Traction kites are defined as steerable kites made to be flown by one person that are used to provide motive force. Typical applications for traction kites include skiing, kite buggying, kite sailing, kite boarding and recreational users who fly such kites on beaches and parks for sensations of power and control. To provide steering and other control movements traction kites have two or more lines, although either two lines or four lines is currently more common.

In general a single flying line cannot easily be used to apply reliable directional control to a kite so single line kites are not steerable in a sense that is useful for the purpose of kite traction. Apart from the exception mentioned below single line kites are not traction kites for the purposes of this invention.

The rare exception when a single line kite can be a traction kite is if control movements to effect steering are transmitted to the kite other than by the operator changing the relative lengths of multiple flying lines. An example is a single line kite that is steerable via kite mounted radio-controlled servos. Being steerable this is also a traction kite. For the purposes of the following description traction kites will be assumed to include this special group of single line kites without further specific reference.

Arch style traction kites are traction kites that also have three other distinguishing characteristics as depicted in FIGS. 2 and 3. These are:

The kites arch shaped profile when viewed from the front while flying. See FIG. 2.

The main flying line attachment points which are at or near the arch tips, See FIGS. 2, 3 and 7.

The presence of some spanwise structural element or elements following the curve of the arch.

Examples of spanwise structural elements are: ram air inflation as used in ram air inflated arch style traction kites, pneumatic leading edge tubes used in the WipiKa type of arch style traction kite, and flexible leading edge rods as used in the FlexiFoil type of arch style traction kites.

FIG. 2 shows the profile of the kite at right angles to the apparent wind direction. The profile is an arch. For convenience of discussion the profile is considered as comprising three sections. A center span area A and shoulder areas B and C.

The kite can have two or more flying lines that are connected to the flier or boat or buggy or other craft. The kite illustrated in FIG. 2 has four flying lines, two front lines 1$a$, 1$b$ and two rear or brake lines 2$a$, 2$b$ connected at either corner of wing tips 5$a$ and 5$b$. FIG. 3 illustrates a side view of the arch style kite in FIG. 2. Arrow 1 indicates the wind direction. Front line 1$b$ is attached at the point where leading edge 3 meets wing tip 5$b$ and brake line 2$b$ is attached at the point where trailing edge 4 meets wing tip 5$b$. There may also be extra lines attached at other points for various purposes other than taking the primary loads. Examples of uses for such extra attachment points are relaunching in reverse from nose down positions, for extra control of angle of attack and to prevent inversions when the kite is over-flown.

Arch style kites that use only a single flying line are not traction kites unless steerable by some system of remote control as described above.

The type of single line kite called a sled as originally patented in the USA by Allison in the 1930's and Scott in the 1950's is neither an arch style kite by this definition nor a traction kite.

The term sled has recently come into popular usage as a name for pneumatic tube framed arch style multi line traction kites, particularly those constructed under U.S. Pat. No. 4,708,078 (Legaignoux et al.) such as the Wipika the description and drawings of which are incorporated herein by way of reference. These kites are not similar to the original Allison/Scott single line sleds because of their different shape, because they are steerable by changing the relative lengths of their various lines and because their primary structure comprises a pneumatic leading edge tube which follows the curve of the arch shape. The original Allison/Scott single line sleds had an unsupported leading edge with chordwise battens as their only structure.

To avoid confusion therefore the term "arch" or "arch style" has been used in place of the sometimes now common usage "sled" when referring to the type of traction kites that is the subject of the current invention.

There are some popular styles of traction kite that are not of the arch style. These include: fully bridled conventional traction kites of the ram air foil type or Bean or C-quad style, for example see WO99/59866; and framed delta style kites of the sports kite genre or such as the Banshee, D Wing or KiteSki™ designs, for example see U.S. Pat. Nos. 5,366,182 and 4,736,914.

Examples of arch style traction kites are: single skin pneumatic tube framed kites such as the Wipika, and other Legaignoux licensee designs, U.S. Pat. No. 4,708,078; bridleless or reduced bridle ram air inflated foil type kites such as the Arc, described in the applicant's PCT application PCT/NZ01/00019 the complete content description and drawings of which are incorporated herein by way of reference; and bridleless ram air inflated kites with flexible leading edge rods such as the FlexiFoil™ style described in U.S. Pat. No. 4,129,272 (Jones et al.) the description and drawings of which are incorporated herein by way of reference.

Current arch style kites generally have a convex leading edge. Referring to FIGS. 4$a$ to 4$c$, for visualisation purposes only, three common leading edge 3 shapes are shown as developments of the kite's arched shapes in which all the chord lines of all the profiles that comprise the airfoil forms are lying in one plane. The lines describing the position of the leading edge 3 of these flattened sections will be either: made up of convex sections of various radii (FIG. 4$a$); or of some convex sections of various radii connected by straight sections (FIG. 4$b$); or in the limit and uncommonly, a straight line (FIG. 4$c$).

Referring to FIG. 5, another way of describing the leading edge 3 shape of current arch style traction kites is that the angle F° between the leading edge 3 of the kite tip-ward (depicted by arrow G) of any chord line 7 and that chord line 7 is usually 90 degrees or less than 90 degrees, providing also that the chord line 7 is drawn so as to be parallel to the apparent wind direction when the kite is flying straight.

In arch style traction kites line loads are accepted into the kite at each wing tip 5$a$, 5$b$ and carried as tension loads in the kite's skin(s) and structure around to the opposite tip. Referring to FIG. 6, because the form of these kites is approximately semicircular in the plane at right angles to the apparent wind direction there are radial resultants Da, Db, Dc, Dd of this circumferential tension acting at all points inwards towards the nominal centre of the arch shape. These radial forces Da–Dd will cause the shoulder areas B, C of the kite to collapse inwards unless resisted by shoulder aerodynamic forces E and by inherent structural rigidity.

Disregarding the kite's weight force which is usually small with respect to other forces, for a kite in steady state flight the net aerodynamic forces generated by airflow over its various parts are exactly balanced by tension loads in the flying lines.

To aid visualising the ever changing disposition of forces acting on various sections of an arch style traction kite it is helpful to consider each small chordwise section of the kite as pivoting around the load line. If the centre of pressure of aerodynamic forces acting on any one of these sections is momentarily not coincident with the kite's load line where it intersects that section the section will tend to rotate around the load line until its local angle of attack has changed sufficiently to bring the section's centre of pressure back into coincidence with load line. In a real kite the structure will resist this rotation, some of which will therefore be transferred to the rest of the kite causing its overall angle of attack to change slightly. This in turn will shift the position of the load line minutely to complete the reestablishment of equilibrium.

The limits of the ability of a particular kite to respond to changes in apparent wind conditions by adjusting to a new equilibrium have a large bearing on its functional usefulness. Three such limits for arch style traction kites are stalling, luffing and shoulder collapsing.

Shoulder Collapse

For arch style traction kites inwards collapsing of the shoulder areas can be a major problem.

For ram air inflated type arch style traction kites, unless there are stiffening battens or bladders the only source of structural rigidity available is internal pressure of never more than a small fraction of a bar bled in from a flow stagnation point. Therefore in this type of arch style traction kite aerodynamic forces are, in a practical sense, the only forces available to resist inward collapsing of the shoulders. When such kites do incorporate stiffening battens or bladders, at least some aerodynamic counter forces are still usually required to prevent shoulder collapses in higher apparent winds.

Even in the more rigid pneumatic tube framed arch style traction kites, the structure is not by itself usually rigid enough to resist the radial forces except in low apparent wind speeds. Therefore, for this type of arch style traction kite these radial forces have to be resisted in part by aerodynamic counter forces in the critical shoulder areas. Contributions that aerodynamic forces make to resisting shoulder collapses allows commensurate reduction in structural rigidity, either by reducing the diameter of the inflated tubes, which has aerodynamic advantages, or by reducing the internal pressure required in the tubes which allows their weight to be reduced, or both.

For arch style kites with structures sufficiently rigid to entirely resist the radial forces it is still desirable to harness some aerodynamic forces to assist in this, at least for reasons of weight saving.

In all cases shoulder area aerodynamic forces must be of sufficient magnitude to oppose whatever parts of the radial resultants of the circumferential tension loads cannot be resisted by the kite's structure. If they are not, the kite shoulders will collapse inward causing the kite to lose its arch shape and fold up.

The most direct way to ensure that more aerodynamic forces are available to prevent the leading edge in the shoulder area collapsing inwards is to move the shoulder area leading edge forward relative to where the load line is likely to be. The more area there is forward of the load line, the higher angle of attack this section will tend to settle to at equilibrium. This combined with its greater area is more likely to reliably generate sufficient aerodynamic force to resist the collapsing tendency with sufficient margin to cover adverse effects from sudden wind shifts and steering inputs.

The most usual way to provide more area ahead of the load line in the shoulder area is to make the shoulder area leading edge convex as shown in FIGS. 4a and 4b. Another way, shown in FIG. 7, is to move the entire leading edge 3 forward, or effectively to move the front line 1a, 1b attachment points back from point where leading edge 3 and wing tips 5a and 5b meet.

It is possible to construct arch style traction kites with very little leading edge convexity, even a basically straight leading edge such as shown in 4c is the limit, but such kites will require more rigid structures and/or be less resistant to shoulder collapsing than arch style traction kites built with more convex leading edge shapes in the shoulder area such as those shown in 4a and 4b.

However, using convex or more convex leading edges in the shoulder area, or shifting the front line attachment point rearward, also causes the load line 6 to be moved further back from the leading edge 3 in the centre span area. This can be seen in FIG. 4a, FIG. 4b and FIG. 7.

The aerodynamic consequences of this will be that the centre span area will generally then operate at a greater angle of attack. This in turn, increases the tendency to stalling, lowers the L/D ratio (because L/D is an inverse function of angle of attack) and reduces the range of pull control available in three and more line versions of such a kite. This last effect is because total pull is proportional to the angle of attack of the centre span section of the kite up to the kite's stall point, and increasing the proportion of the total kite pull that is taken via the rear lines increases the kite's angle of attack. If the angle of attack is already set by the kite's basic geometry close to that at which stalling occurs the range of pull control available will be small.

These consequences are generally so disadvantageous that arch style traction kites of all types are usually built with fairly straight or just slightly convex leading edges notwithstanding that for such kites, the contribution available from shoulder area aerodynamic forces towards resisting shoulder collapsing forces will be less than when there is greater leading edge convexity in the shoulder area.

Objects of the Invention

It is an object of the current invention to provide a design for arch style traction kites which allows greater utilisation of aerodynamic forces in resisting shoulder collapse without adversely affecting the overall performance of the kite.

It is a further object of the current invention to provide a design for arch style traction kites that further improves their performance.

It is a further object of the current invention to provide a design for arch style traction kites that ameliorates a number of disadvantages with prior art kite designs, or at least to provide the public with a useful alternative.

SUMMARY OF THE INVENTION

According to a broadest aspect the invention provides for an arch style traction kite including:
  a wing or wing envelope which has a leading edge which, when viewed in plan with the wing or envelope laid in a horizontal plane, is concave in a centre section of the wing or envelope and straight or convex in plan near the tips of the wing.

According to another aspect of the invention there is provided an arch style traction kite including:

- a flexible airfoil shaped wing formed from flexible material so that the wing has a flexible surface, the wing having a leading edge, a trailing edge, wing tips and a structural element or elements to give spanwise form to the wing;
- at least two flying lines for restraining and controlling the wing, at least one of said flying lines being attached either directly, or indirectly by way of two or more bridle lines, to or near each wing tip; and wherein, the leading edge is, when viewed in plan with the wing laid in a horizontal plane, adapted to be concave in a centre section of the wing, and straight or convex in sections near the wing tips.

Preferably the spanwise structural element or elements is a flexible or semi-flexible rod, or an inflated pneumatic tube, or ram air inflated section.

In a first particular aspect the invention provides for an arch style traction kite including:

- an upper wing surface and a lower wing surface constructed from flexible materials, the upper and lower surfaces being joined to form a flexible airfoil shaped wing envelope having a leading edge, a trailing edge and wing tips;
- a plurality of flexible material walls disposed, substantially at directions parallel to airflow over the wing envelope, between the upper and lower surfaces to form a plurality of cells within the wing envelope;
- one or more openings, said openings optionally having valves, substantially at or near a flow stagnation point of the wing envelope such that air can enter and inflate the wing envelope; and wherein,
- the leading edge is, when viewed in plan with the wing envelope laid in a horizontal plane, adapted to be concave in a centre section of the wing envelope, and straight or convex in sections near the wing tips.

In a second particular aspect the invention provides for an arch style traction kite including:

- an airfoil shaped wing formed as a single skin surface constructed of a flexible material and shaped and adapted to form a leading edge, a trailing edge and wing tips;
- an inflatable pneumatic tube leading edge member extending along the leading edge;
- two or more spines, inflatable or otherwise, extending from the inflatable leading edge member in a chordwise direction over the entire chord of the wing; and
- wherein the leading edge is, when viewed in plan with the wing laid in a horizontal plane, adapted to be concave in a centre section of the wing, and straight or convex in sections near the wing tips.

Preferably when flying the traction kite is substantially an arch shape when viewed from a plane normal to the apparent wind direction.

Further aspects of the invention will become apparent from the following description, which is given by way of example only.

BRIEF DESCRIPTION OF THE DRAWINGS

The invention will now be described with reference to the following drawings in which.

DESCRIPTION OF THE PREFERRED EXAMPLES

The current invention includes one or more changes from the shape of prior art traction kites to a new and different shape. This is essentially a change in the shape of the leading edge 3 as depicted in FIGS. 8 and 9.

Figure 8A:
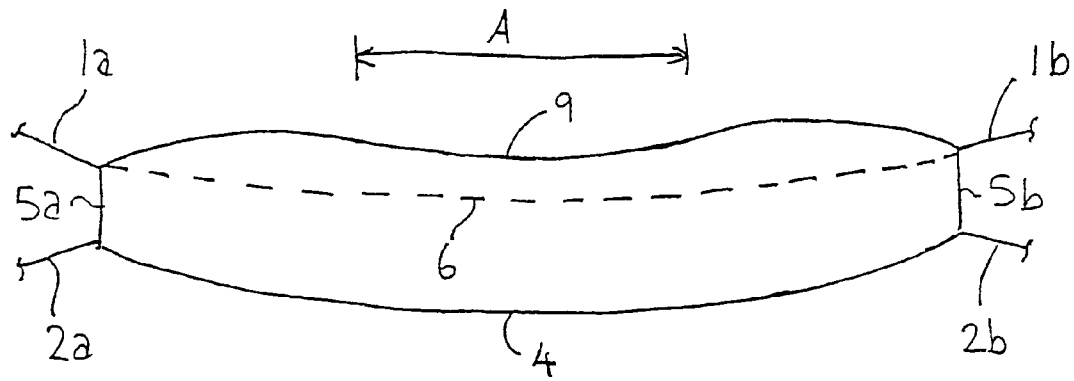
FIGS. 8a–8c: illustrate arch style traction kites flattened out to show leading edge shapes according to the invention.
Figure 8B:
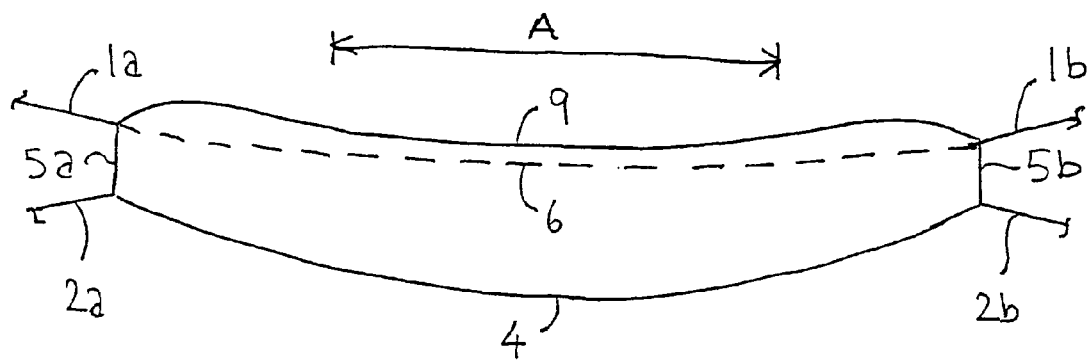
Figure 8C:
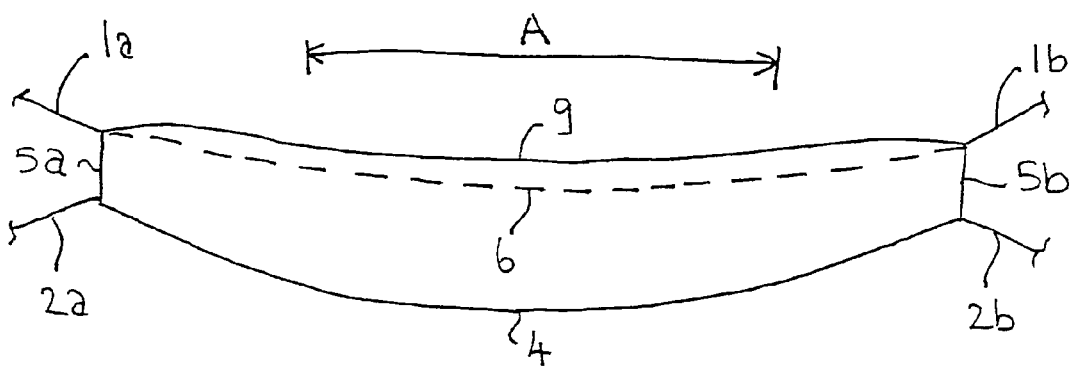

Referring to FIG. 8, the essential change that best describes this improvement for arch style traction kites is that, by the first way of describing the leading edge shapes of arch style traction kites from above, the leading edge 9 is made to be concave in at least part of the mid span section A when viewed in plan as a development of the kite's form in which all the chord lines of all the sections lie in one plane.

Figure 9:
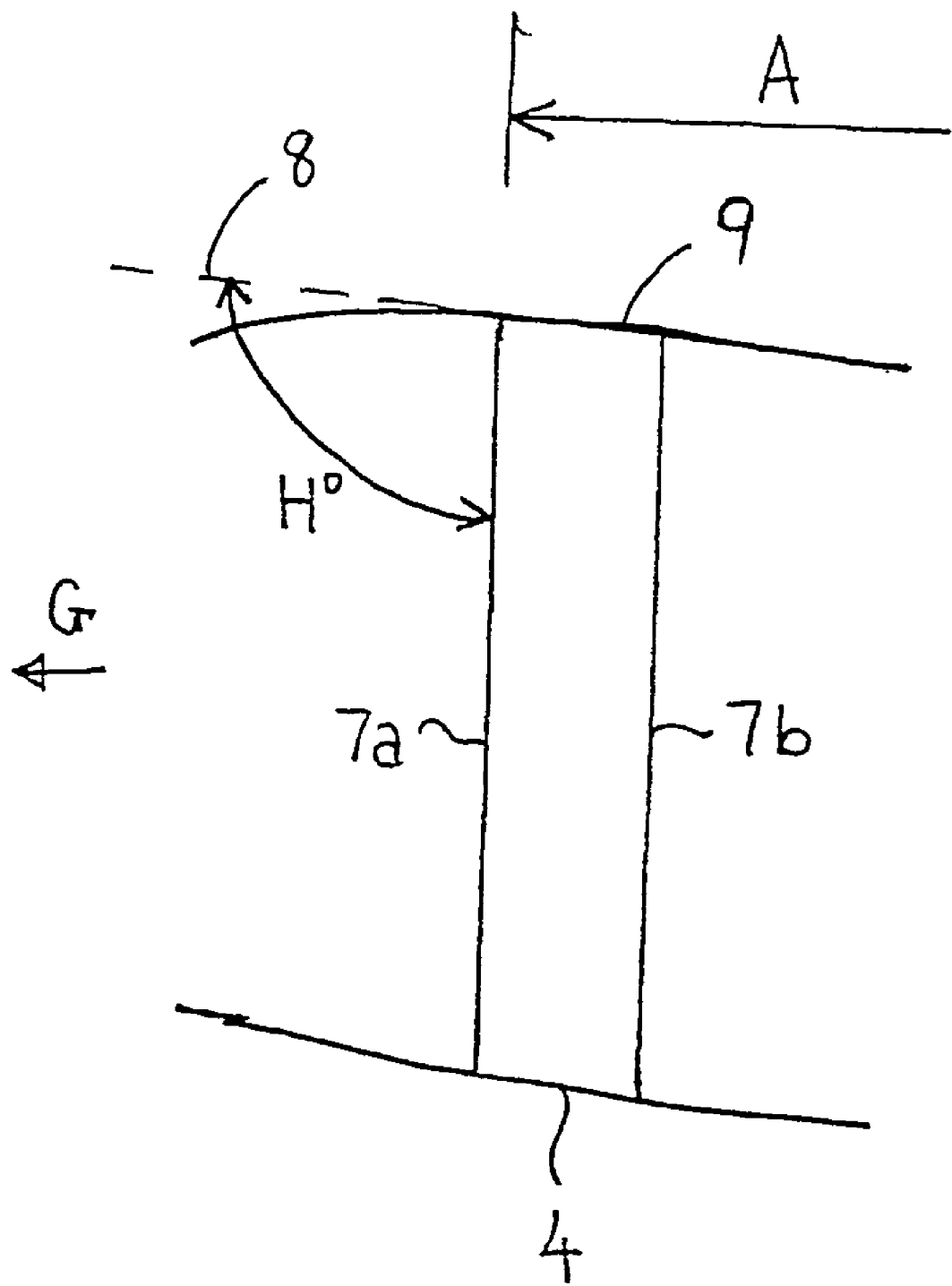
FIG. 9: illustrates a section through an arch style traction kite according to the invention.

Referring to FIG. 9, a second way of describing the leading edge 9 shape of arch style traction kites when viewed from above, when incorporating this improvement, the angle H° between the leading edge 9 of such a kite tip-ward (indicated by arrow G) of any chord line 7 and that chord line 7 will be more than 90 degrees for significant sections of the leading edge 9 in the central span area A providing also that the chord line 7 is drawn so as to be parallel to the apparent wind direction when the kite is flying straight.

In addition to introducing centre span A leading edge 9 concavity the current invention also envisages an increase in the amount of leading edge 9 convexity in the areas B, C (shown in FIG. 11) nearest to the wing tips 5a, 5b. However, this is not critical to the invention. At least, there will not be a decrease in the convexity in plan of these portions of the leading edge 9 to less than they would have had in successful prior art designs.

Figure 10:
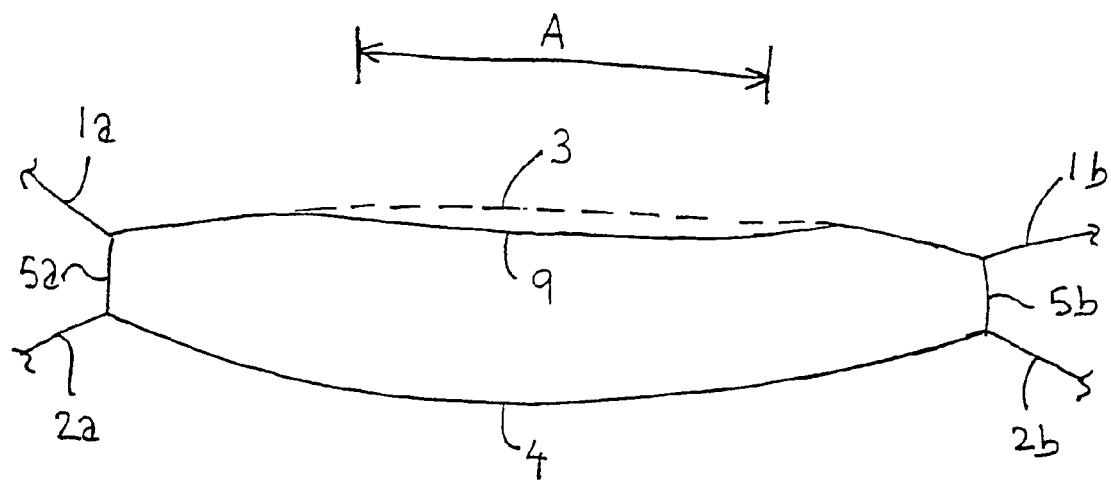
FIG. 10: illustrates an arch style traction kite flattened out to show leading edge shapes.

FIG. 10 shows a developed view of a traction kite with prior art leading edge 3 (dotted) and improved concave leading edge 9. In this illustration leading edge 9 is no more convex in plan than prior art leading edge 3, but is concave in plan through center span A.

Figure 11:
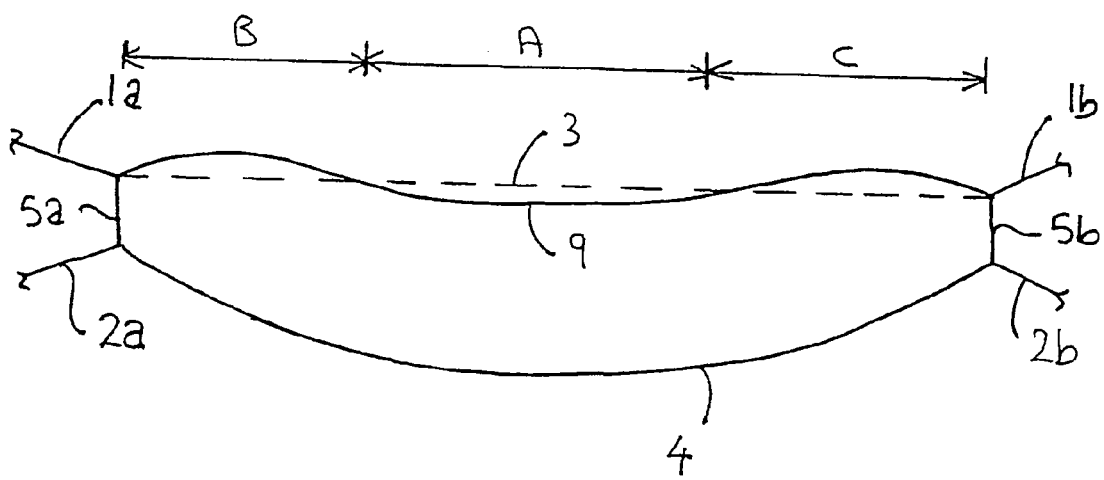
FIG. 11: illustrates an arch style traction kite flattened out to show leading edge shapes.

FIG. 11 shows another developed view of a traction kite with prior art leading edge 3 and improved concave leading edge 9. In this illustration leading edge 9 is more convex in plan than prior art leading edge 3 in shoulder areas B, C and concave in plan through center span A.

There are various reasons why these changes improve the performance of arch style traction kites, some of which derive from extending the limits within which the forces acting on the kite will remain in equilibrium as described above.

By constructing an arch style traction kite so that the centre section A of leading edge 9 is concave while the shoulder sections B, C remain convex or are even made more convex it is possible to utilise the resistance to shoulder collapsing that such convex leading edge shoulders B, C impart while regaining the option of having the centre section A operating at the lower angle of attack which is otherwise only available in conjunction with a less convex or even straight leading edge. The advantages of this are greater resistance to stalling, better L/D and, in the case of versions of arch style traction kites that use more than two lines, a greater range of pull control and faster steering.

Steering is faster because the brake lines will be taking more of the total line load for all angles of attack except the minimum available, and even then there will be less slack to take up in the brake lines before steering becomes effective. When a higher proportion of the total kite pull is taken through the brake lines in any given flying condition, a smaller change in the relative lengths of the brake lines is required to have the same or greater steering effect on the kite.

Figure 6:
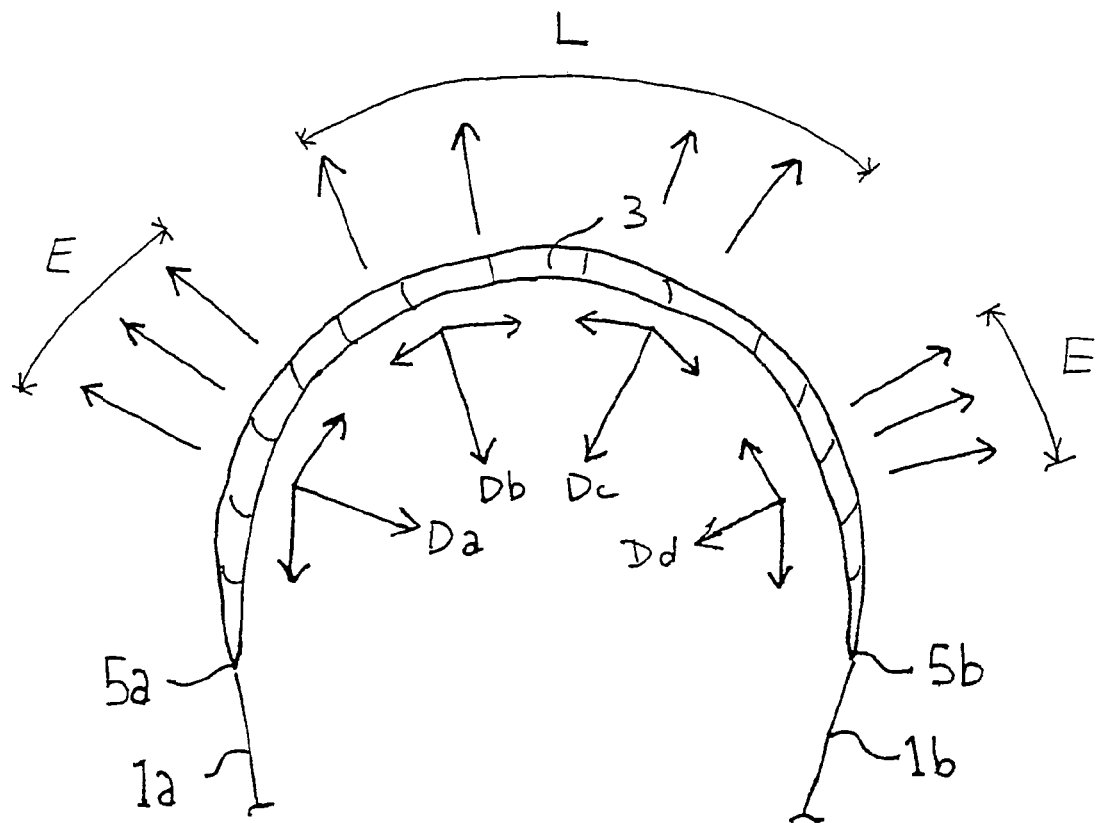
FIG. 6: illustrates the dynamic forces on an arch style traction kite.
Figure 1:
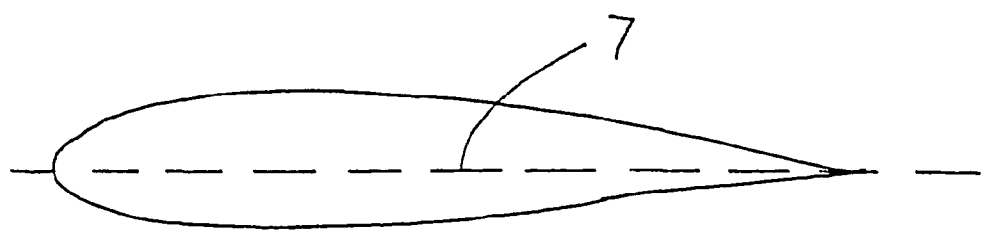
FIG. 1: illustrates an airfoil profile showing the chord line.
Figure 2:
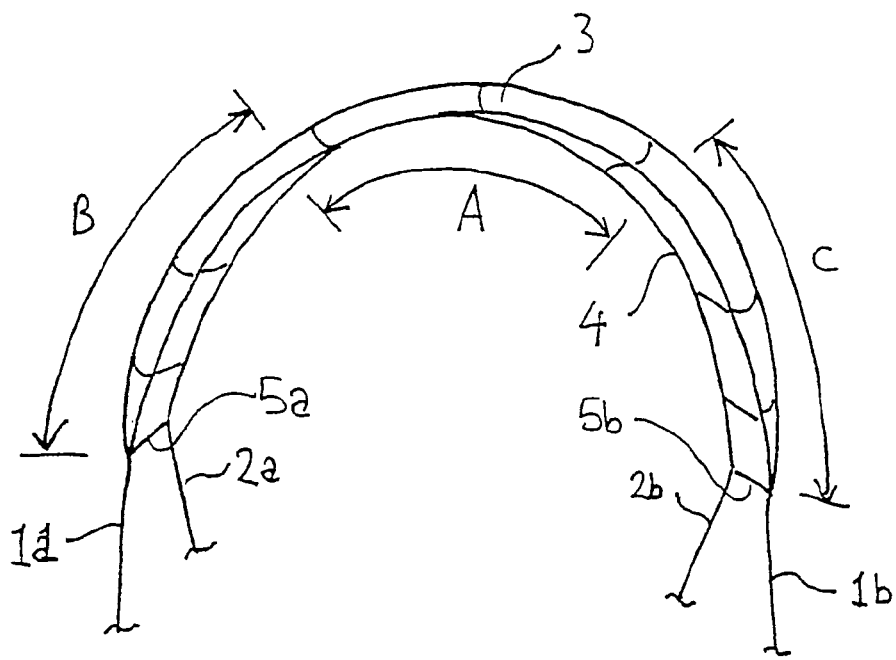
FIG. 2: illustrates a front view of an arch style traction kite while flying.
Figure 3:
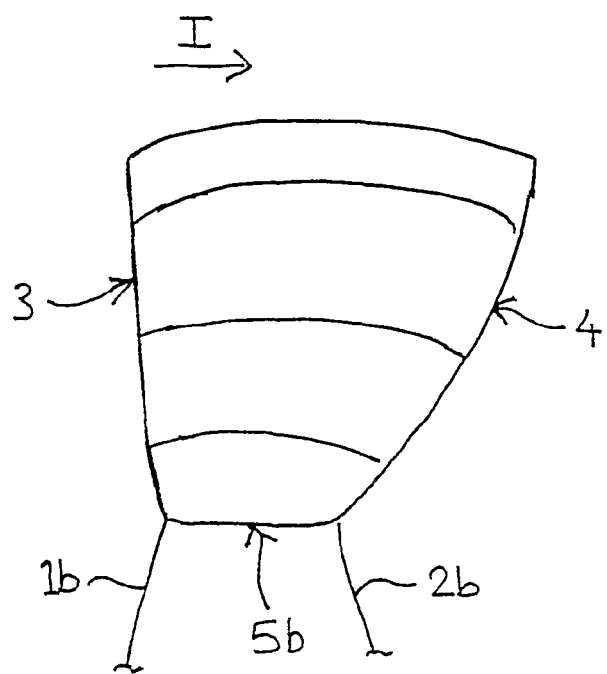
FIG. 3: illustrates side view of the arch style traction kite of FIG. 2,
FIGS. 4a–4c: illustrate prior art arch style traction kites flattened out to show leading edge shapes.
Figure 4A:
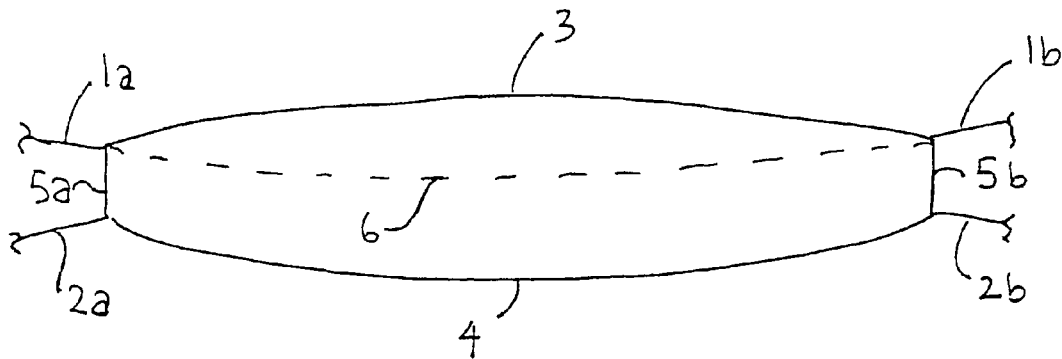
Figure 4B:
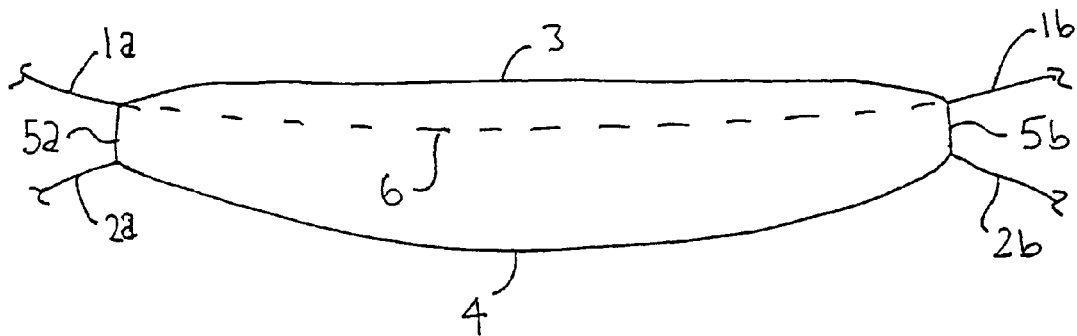
Figure 4C:
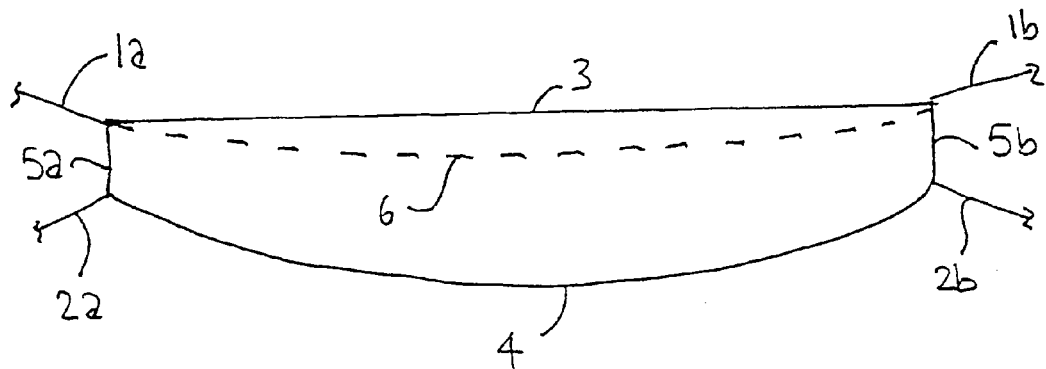
Figure 5:
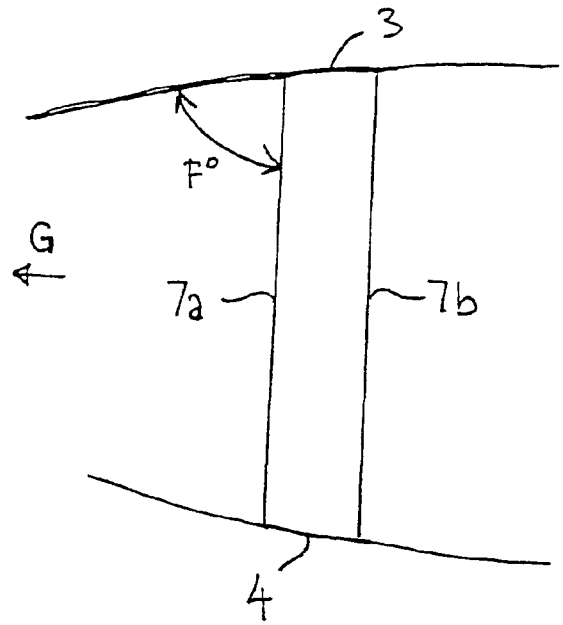
FIG. 5: illustrates a section of a prior art arch style traction kite.
Figure 7:
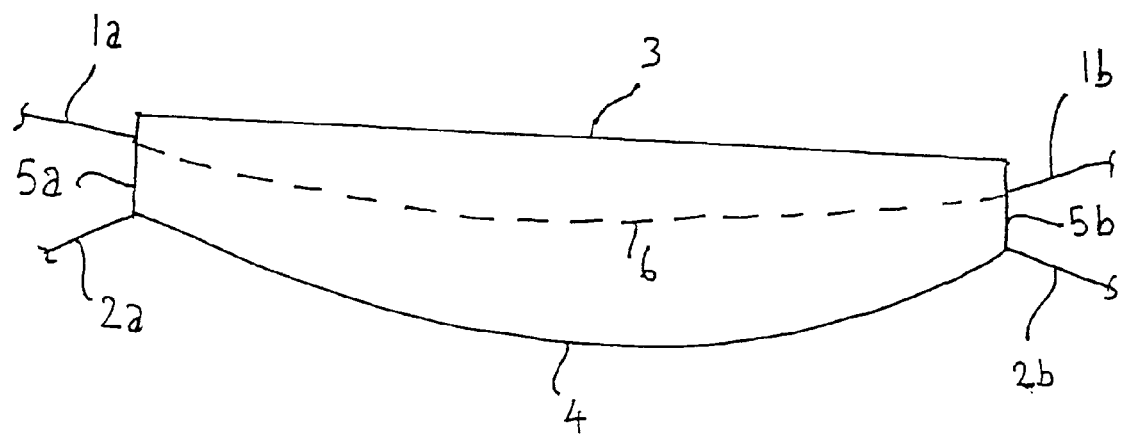
FIG. 7: illustrates a prior art method of providing greater area forward of the cord line.

By increasing the concavity in plan of the centre section A leading edge 9 still further, the forward limit of the range over which the load line can be moved will be closer to the leading edge 9 than is possible even with a completely straight leading edge geometry— compare FIGS. 2c and 4b. This opens up possibilities of lower stall speeds, higher L/D and more pull control than is available with convex or straight leading edge arch style traction kites.

Extra shoulder area B, C leading edge 9 convexity to assist in resisting shoulder collapsing without reducing performance in other respects is also advantageous for all arch style traction kites. It is particularly so for ram air inflated arch style traction kites with few or no stiffening battens, especially as a kite gets older and its skins become worn and a little porous For two line arch style traction kites this improvement offers improved resistance to shoulder collapses, little change to the maximum amount of pull available or the L/D at which this occurs and the possibility of providing alternate riggings at which pull will be lower and L/D higher.

For arch style traction kites with more than two lines this improvement offers improved resistance to shoulder collapses, little change to the maximum amount of pull available or the L/D at which this occurs and, by the flier decreasing the proportion of line loads taken by the brake lines at any time, a greater range of decrease in the kites pull and increase in its L/D.

The higher L/D that comes with decreasing the kite's angle of attack is advantageous for all forms of arch style traction kites that have pull control systems even though it is applicable only when the kites are operated in the lower end of their pull control range.

Examples of how arch style traction kites of different styles incorporating the improvements can be constructed are described below.

A way to construct single skin pneumatic tube framed type arch style traction kites so as to have concave leading edge shapes in the centre span area would be to take the skin of a such a kite that has a convex or straight leading edge, slit it chordwise at one or more centre span places and add in chordwise wedges of skin material with their widest end at the kite's trailing edge and narrowest end to the leading edge. This increases the trailing edge spanwise dimension in the central span area without substantially changing the leading edge dimensions in the spanwise dimension so causing the leading edge shape to become concave in the central span area.

To increase the convexity of the leading edge in the tip/shoulder area a technique would be to slit the skin chordwise in the shoulder area and remove a wedge of skin material tapering in width from zero at the leading edge.

In conjunction with either or both of these skin changes it could be useful to also reshape the outer envelope of the leading edge inflated tube so as to match the skin changes.

There are other ways to cause the desired shape changes that will be obvious to kite designers without further explanation.

A way to construct a double skin with ribs type ram air inflated arch style traction kite with concave leading edge in the central span area and convex leading edges in the tip/shoulder areas is to use wedge shaped panels, wider towards their trailing edge, for the upper and lower skins in the centre span area and wedge shaped panels with their wider end at the leading edge for some upper and lower panels in the tip or shoulder areas.

Another way to construct a double skin with ribs type ram air inflated arch style traction kite so as to have a concave leading edge in the centre span area is to increase the angle between the centre-ward chordwise edge of each panel and it's leading edge for some upper and lower skin panels in the kite's centre span area, at the same time decreasing the angles between the centre-ward chordwise edges of these panels and their trailing edges so that the tip side chordwise edge dimension of each panel does not change.

There are other ways to create this desired shape which will be obvious to kite designers without further explanation.

A way to construct FlexiFoil™ type arch style traction kites with shoulder leading edge convexity and centre span leading edge concavity is as for the double skin with ribs type example above but with the further addition of a pre-curved leading edge rod to complement the shape set by the skin panels.

There are other ways also to create the desired convex/concave shape that will be obvious to kite designers without further explanation.

It can be desirable to make a kite's shape adjustable to suit changing wind conditions and operator preferences.

For ram air inflated arch style traction kites it is possible to provide for the amount of concavity in the centre span leading edge area, an essential feature of this improvement, is that it be made adjustable. This can be done by way of, for example, an adjustable length cord applied spanwise to the kite's lower skin at 0 to 40% of chord from the leading edge and preferably at approximately 25% of chord from the leading edge. Shortening this cord increases the amount of concavity of the leading edge in it's vicinity.

There are other ways to enable periodic changes to be made in the concavity of a kite's leading edge centre span area that will be obvious to a kite designer without further explanation.

Except for the special case of the FlexiFoil™ type, arch style traction kites are seldom if ever built with sufficient structural rigidity to withstand shoulder collapsing forces except in light winds because the weight and other performance penalties of doing so are unacceptably high. Arch style traction kites generally use quite flexible structures either because more rigid structures weigh more which diminishes performance and are often not as robust or because the internal volume of flexible pneumatic tubes and ram air construction is a useful aid to water relaunchability as compared to more rigid fibre reinforced plastic rods or tubes. Even for arch style traction kites with more rigid structures than are currently usual, this improvement will still be advantageous because it decreases the necessity for rigidity, and hence reduces weight, cost and, often, fragility.

The present invention has been particularly described with reference to the invention and application to a traction kite of the general form described in the applicant's PCT/NZ01/00019. It is however contemplated that the essential concave leading edge feature can be incorporated in ram air inflated kites, single skin pneumatic tube framed kites and bridleless ram air inflated kites with flexible leading edge rods or in kites incorporating a combination of the features of such kites.

Where in the aforegoing description reference has been made to particular elements or integers having known equivalents then such equivalents are included as if individually set forth.

Particular embodiments of the invention have been described and it is envisaged that improvements and/or modifications can take place without departing from the spirit or scope of the invention as defined in the accompanying claims.

What is claimed is:

1. An arch style traction kite including:
   a flexible airfoil shaped wing formed from flexible material so that the wing has a flexible surface, the wing having a leading edge, a trailing edge, wing tips and a structural element or elements to give spanwise form to the wing;
   at least two flying lines for restraining and controlling the wing, at least one of said flying lines being attached either directly, or indirectly by way of two or more bridle lines, to or near each wing tip; and wherein, the leading edge is, when viewed in plan with the wing laid in a horizontal plane, adapted to be concave in a centre section of the wing, and straight or convex in sections near the wing tips.

2. An arch style traction kite as claimed in claim 1 wherein the spanwise structural element or elements is a flexible or semi-flexible rod, or an inflated pneumatic tube, or a ram air inflated section.

3. An arch style traction kite including:
   an upper wing surface and a lower wing surface constructed from flexible materials, the upper and lower surfaces being joined to form a flexible airfoil shaped wing envelope having a leading edge, a trailing edge and wing tips;
   a plurality of flexible material walls disposed, substantially at directions parallel to airflow over the wing envelope, between the upper and lower surfaces to form a plurality of cells within the wing envelope;
   one or more openings, substantially at or near a flow stagnation point of the wing envelope such that air can enter and inflate the wing envelope; and wherein, the leading edge is, when viewed in plan with the wing envelope laid in a horizontal plane, adapted to be concave in a centre section of the wing envelope, and straight or convex in sections near the wing tips.

4. An arch style traction kite including:
   an airfoil shaped wing formed as a single skin surface constructed of a flexible material and shaped and adapted to form a leading edge, a trailing edge and wing tips;
   an inflatable pneumatic tube leading edge member extending along the leading edge;
   two or more spines, inflatable or otherwise, extending from the inflatable leading edge member in a chordwise direction over the entire chord of the wing; and wherein the leading edge is, when viewed in plan with the wing laid in a horizontal plane, adapted to be concave in a centre section of the wing, and straight or convex in sections near the wing tips.

5. An arch style traction kite as claimed in claim 1 wherein the wing is substantially an arch shape when the wing is erect and flying forward horizontally and viewed from a point forward of the wing.

6. An arch style traction kite as claimed in claim 1 wherein the shape of at least the concave section of the wing is adjustable.

7. An arch style traction kite as claimed in claim 6 wherein an adjustable length of cord is applied spanwise to the wing's lower skin at between 0 and 40% of chord from the leading edge so that shortening of this cord increases the amount of concavity of the leading edge in it's vicinity.

8. An arch style traction kite as claimed in claim 7 wherein the length of cord is applied at about 25% of chord.

9. An arch style traction kite including a wing or wing envelope which has a leading edge which, when viewed in plan with the wing or envelope laid in a horizontal plane, is concave in a centre section of the wing or envelope and straight or convex in plan near the tips of the wing.

10. An arch style traction kite as claimed in claim 9 wherein the wing or envelope is the wing or envelope of a ram air inflated kite, single skin pneumatic tube framed kite, a ram air inflated kite with flexible leading edge rods or a kite incorporating a combination of the features of such kites.

* * * * *